United States Patent [19]

Davida

[11] 4,417,338
[45] Nov. 22, 1983

[54] CRYPTOGRAPHIC KEY SHARING CIRCUIT AND METHOD USING CODE CORRECTION

[75] Inventor: George I. Davida, Tucker, Ga.

[73] Assignee: Wisconsin Alumni Research Foundation, Madison, Wis.

[21] Appl. No.: 253,563

[22] Filed: Apr. 13, 1981

[51] Int. Cl.³ .............................................. G06F 11/10
[52] U.S. Cl. ................................... 371/37; 178/22.09; 340/825.34
[58] Field of Search ............ 371/37; 178/22.01, 22.08, 178/22.09, 22.10, 22.11; 340/825.31, 825.34

[56] References Cited

U.S. PATENT DOCUMENTS

| | | | |
|---|---|---|---|
| 4,160,120 | 7/1979 | Barnes et al. | 178/22.09 |
| 4,165,444 | 8/1979 | Gordon | 178/22.09 |
| 4,172,213 | 10/1979 | Barnes et al. | 178/22.09 |
| 4,283,599 | 8/1981 | Atalla | 340/825.34 |

Primary Examiner—Charles E. Atkinson
Attorney, Agent, or Firm—Robert W. Cook; Howard W. Bremer

[57] ABSTRACT

A circuit and method for sharing a key among n individuals by distributing a secondary key to each of the n individuals such that only k of the n secondary keys are required in order to reconstruct the key, where k may be less than n. The key is encoded into a code vector which is corrupted by combining it with an error vector to yield a corrupted code vector. The secondary keys are chosen so that each one is a mutually exclusive part of the error vector. Reconstructing the key, which is the objective of the process and is analagous to opening a lock, requires correcting the corrupted code vector and transforming the code vector into the key. The corrupted code vector is corrected by a combination of an error correcting code and use of at least k of the secondary keys. Each secondary key can be used to correct the errors introduced in the part of the error vector that it comprises, and if less than k secondary keys are present, then even after the secondary keys have been used to correct the corresponding errors there are too many errors remaining for the error correcting code to correct, resulting in a failure to reconstruct the code vector or key.

5 Claims, 2 Drawing Figures

CRYPTOGRAPHIC KEY SHARING CIRCUIT AND METHOD USING CODE CORRECTION

The Government has rights in this invention persuant to Grant number MCS-77-01236 awarded by the National Science Foundation.

BACKGROUND OF THE INVENTION

This invention relates to key management schemes for cryptographic systems and more particularly to a circuit and method for sharing a key amoung several individuals.

The protection of data which is used in computer systems has become an important subject. Most efforts to provide data security have consisted of the design of cryptosystems of various types. One of the basic assumptions of a cryptosystem is that authorized users will have possession of a small piece of data called a key which will allow them access to the larger collection of data. Although some very good cryptosystems have been developed, relatively little attention has been given to an associated problem referred to as the key management problem. The essence of the key management problem is that regardless of the quality of the security provided by the cryptosystem used, if the key is compromised then the cryptosystem is compromised. Since keys must be distributed to the authorized users, often across large physical distances, the ultimate security of the cryptosystem is no better than the key management scheme. Suggestions of using a cryptosystem to distribute the key for another cryptosystem changes the problem but doesn't solve it.

One method of improving the security of key management is to distribute a number of keys to different individuals, such that a certain number of the keys must be present in order to reconstruct the original keys which is then used to either provide access to data or to unlock some item or start some process. One example of such a system would be in a business where financial transactions require several employees to use their keys at the same time, similar to the requirement for multiple signatures on a check. Another application would be in a voting system where it is desired to allow a majority of the distributed keys to authorize some process. Another application would be in a safe deposit box type of situation where it is desirable to require more than one key to open a lock.

It is an object of this invention to generate secondary keys corresponding to a key such that a certain predetermined number of the secondary keys will allow the reconstruction of the key, however if one less than the predetermined number of secondary keys is present the key can not be determined.

SUMMARY OF THE INVENTION

In accordance with the present invention a method for generating a number of secondary keys and using some of the secondary keys to reconstruct a code vector comprises: choosing the number of secondary keys, assigning to each such secondary key some digit positions of the code vector to generate errors in, choosing an error correcting code system, calculating a corrupted code vector by generating errors in the digit positions corresponding to the error digits assigned to the secondary keys, and reconstructing the code vector by using some of the secondary keys to correct errors in the erroneous digit positions assigned to those secondary keys, followed by using the error correcting code system to correct the remainder of the errors in the corrupted code vector to yield the code vector.

BRIEF DESCRIPTION OF THE DRAWING

A cryptographic key sharing circuit and method using code correction according to this invention will be better understood from a consideration of the detailed description of the organization and operation of one illustrative embodiment thereof which follows when taken in conjunction with the accompanying drawing, in which.

DETAILED DESCRIPTION

Figure 1:
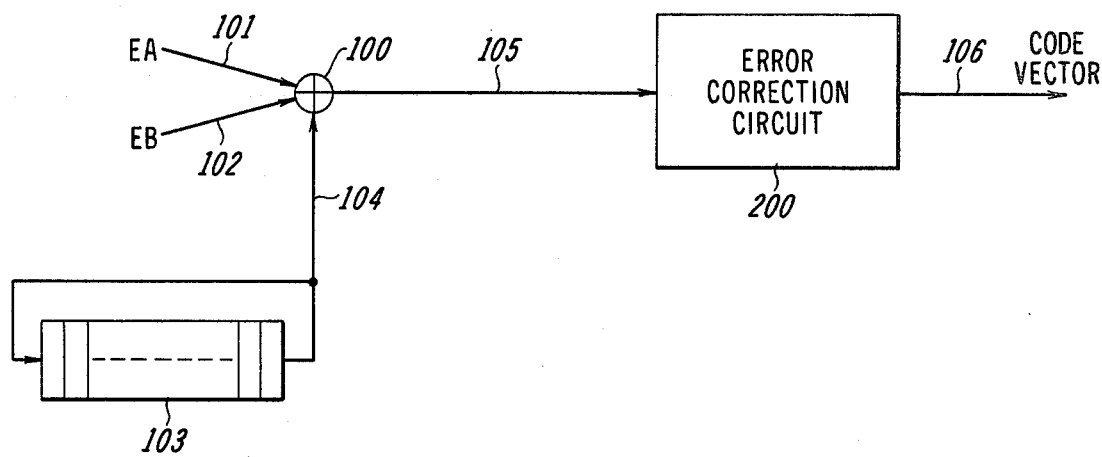
FIG. 1 depicts an exemplary cryptographic key sharing circuit according to this invention.

One illustrative cryptographic key sharing circuit using code correction is shown in FIG. 1 comprising an addition circuit 100 for adding the binary signals received at the three inputs of addition circuit 100, yielding output therefrom the sum modulo 2 of the three inputs. A first secondary key EA is connected to a first input of the addition circuit 100 by means of a conductor 101. A second secondary key EB is connected to a second input of the addition circuit 100 by means of a conductor 102. Although addition circuit 100 is shown as a circuit for adding binary serial bit streams, it could also comprise a multibit parallel addition circuit.

A shift register 103 comprises fifteen flip flops connected such that upon receiving a command to shift, each flip flop transfers it's contents to the flip flop to it's right. Shift registers are well known in the art. If addition circuit 100 comprises a parallel addition circuit then shift register 103 would be a parallel register or memory circuit. A conductor 104 is used to connect the output of the rightmost flip flop of shift register 103 to the input of the leftmost flip flop of shift register 103 as well as connecting the output of the rightmost flip flop of shift register 103 to a third input of the addition circuit 100. Shift register 103 is used to hold the corrupted code vector which has been corrupted by the combination of all of the secondary keys plus an additional error vector. As the corrupted code vector is added to the secondary keys presented on inputs EA and EB, the errors which were originally introduced by the same secondary keys are corrected, leaving as residual errors the errors corresponding to the secondary keys which are not present and the additional code vector.

An error correction circuit 200 comprises an input, an output and means for translating a corrupted code vector presented at it's input into the corresponding correct code vector. Error correction circuits are well known in the art, for example, see Elwyn R. Berlekamp, "Algebraic Coding Theory," McGraw Hill, 1968. There are available in the art many different error correction circuits and methods having different numbers of data bits, redundant checking bits and error detection and correction capabilities. The particular error correction circuit and method described in the following is only one example chosen for illustrative purposes. The input of error correction circuit 200 is connected to the output of addition circuit 100 by means of a conductor 105. The output of error correction circuit 200 is connected to a code vector output by means of a conductor 106.

Figure 2:
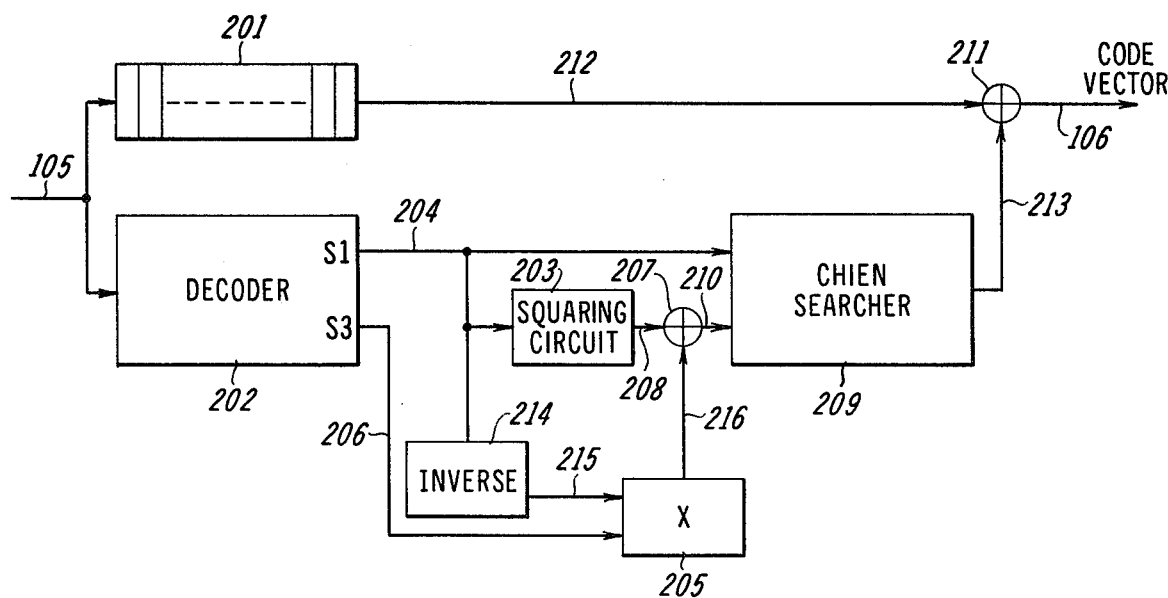
FIG. 2 depicts an exemplary error correction circuit for use in the circuit of FIG. 1.

An example of an error correction circuit 200 suitable for use in this invention is shown in FIG. 2 in more detail. The error correction circuit 200 comprises a shift register 201 for use as a buffer register and a decoder circuit 202 for calculating power sums 51 and 52. The shift register 201 comprises an input connected to addition circuit 100 by means of conductor 105, an output and fifteen flip flops connected as a shift register. The decoder circuit 202 comprises an input connected to addition circuit 100 by means of conductor 105, an S1 output, an S2 output and means for calculating and presenting at the outputs the power sums S1 and S2 given a corrupted code vector at the input of decoder circuit 202. The decoder circuit 202 is well known and is described in more detail in FIG. 5.06 on p. 126 of the hook by Berlekamp.

Error correction circuit 200 further comprises a squaring circuit 203. Squaring circuit 203 comprises an input connected to the S1 output of decoder 202 by means of a conductor 204, an output and means for presenting at the output thereof the square of the input thereof. Error correction circuit 200 further comprises an inversion circuit 214. Inversion circuit 214 comprises an input connected to the S1 output of decoder 202 by means of conductor 204, an output and the means for presenting at the output thereof the inverse of the signal presented at the input thereof. Inversion circuits are well known in the art. Error correction circuit 200 further comprises a multiplication circuit 205. Multiplication circuit 205 comprises a first input connected to the S3 output of decoder 202 by means of conductor 206, a second input connected to the output of inversion circuit 214 by means of conductor 215, an output and means for presenting at the output thereof the result of the multiplication of the signal present at the first input thereof by the signal present at the second input thereof. Error correction circuit 200 further comprises an addition circuit 207. Addition circuit 207 comprises a first input connected to the output of squaring circuit 204 by means of a conductor 208, a second input connected to the output of multiplication circuit 205 by means of a conductor 216, an output and means for presenting at the output thereof the sum modulo 2 of the signals present at the two inputs thereof.

Error correction circuit 200 further comprises a Chien Searcher circuit 209. The Chien Searcher circuit 209 comprises a first input connected to the S1 output of decoder 202 by means of conductor 204, a second input connected to the output of addition circuit 207 by means of conductor 210, an output and means for generating a serial bit stream at the output thereof which when added to the corrupted code vector will correct up to two errors in the corrupted code vector. The particular Chien searcher used in this example can be found described in more detail in FIG. 5.11 on p. 134 of the book by Berlekamp.

Error correction circuit 200 further comprises an addition circuit 211. The addition circuit 211 comprises a first input connected to the output of shift register 201 by means of a conductor 212, a second input connected to the output of Chien Searcher Circuit 209 by means of conductor 213, an output connected to the Code Vector output by means of a conductor 106 and means for generating a serial bit stream at the output thereof which is the sum modulo 2 of the inputs thereof.

An illustrative operation of the cryptographic key sharing circuit and method using code correction may now be considered. The first step is to choose the number of individuals who will receive secondary keys and therefore the number, n, of secondary keys which will be generated. The number, n, of individuals who will receive secondary keys is determined by considerations such as the number of employees who are responsible for a certain data storage or data channel. For the sake of this example let us assume that the number of such individuals and therefore the number of subkeys generated and distributed is three. We will also assume that we have chosen a code vector length of 15 bits.

The second step is to assign a subset comprising two of the 15 bit positions to each of the three subkeys in a random manner. The assignment of mutually exclusive error bit positions to each of the subkeys is assumed for the purpose of this example. If the subkey bit positions are not mutually exclusive then addition circuit 100 must be replaced with a more complex circuit. Such circuits for use with non mutually exclusive bit position errors are well known in the art. Let us call the three subkeys so generated E1, E2 and E3. The following is one such assignment of subkeys:

$E1 = 001000000000100$ $E2 = 000001000000010$ $E3 = 010000010000000$

We will refer to ET as the sum modulo two of all of the secondary keys. In this example:

$ET = 011001010000110$

Notice that ET has a total of six errors where the number of total errors is equal to the number of secondary keys times the number of errors in each secondary key, or three times two in this example. If the error bit positions assigned to each of the subkeys are not mutually exclusive then the total number of errors will be less than the number of secondary keys times the number of errors in each secondary key. In general it may also be desirable to add modulo two, an additional error vector, which is not given out as a subkey, to the secondary keys in order to yield ET. The number of errors in a secondary key, which is an error vector and is so referred to in the art of error correcting codes, is equal to the number of ones in the secondary key. The number of errors or the number of ones in an error vector is referred to as the Hamming weight in the art of error correcting codes and is referred to symbolically in the following form:

$W(ET) = W(011001010000110) = 6$

It is customary in the use of error correcting codes to start with a certain number of data bits, for example a certain predetermined key in this invention, and encode those data bits into a code vector. After this code vector has been corrupted it can be corrected by the error correction circuit, provided that the number of errors does not exceed the error correcting capability of the error correction circuit. It is then customary to transform the code vector into the original data bits. The transformation from data bits to code vector and back again may be simple, e.g. the data bits are first in the code vector and then all of the check digits follow, or may be a very complex function.

Although in some applications it may be desirable to use this invention in the above manner, e.g. the user would provide the key which he would like to have produced by the lock mechanism, which would have to be coded into a code vector for use in this invention and transformed back into the key after it is corrected by the error correction circuit, it may be desirable to allow the code vector to be chosen for the user as a part of this invention.

It may be desirable to use the entire code vector as the key which is output by this invention, e.g. for use in a cryptosystem. The particular code vector should be chosen randomly from among all available code vectors, e.g. by choosing the data position randomly and then encoding the randomly chosen data position into the corresponding code vector.

It is desirable to make the code vector have a large number of digits or bits. If the length of the actual key which is to be produced is smaller than the code vector length desirable for the purpose of this invention, then it can be augmented by adding additional random bits which can then be removed at the output of this invention. Another technique may be to perform a reducing function on the output code vector which reduces the number of bits, e.g. division by a prime number and using the remainder.

The longer the code vector the more secure the key sharing method and circuit will be. The required length of the code vector should be determined according to the number of secondary keys n, the number of secondary keys k and the users security requirements.

For the purposes of this example a double-error-correcting binary BCH code has been chosen as described in detail in section 5.2, starting at page 125 of Berlekamp's previously mentioned book. This chosen error correcting code uses a total of 15 bits, 7 of which are information bits and 8 of which are checking and correcting bits.

For illustrative purposes the following code vector has been randomly chosen and will be referred to as V:

$$V = 110010110101011$$

The next step is to calculate a corrupted code vector referred to as CV, by doing the modulo 2 addition of the code vector and ET as follows:

```
V    110010110101011
ET + 011001010000110
CV   101011100101101
```

Notice that for each one that existed in a secondary key there has now been created an error in the code vector as it was transformed into the corrupted code vector, CV.

The next step is to reconstruct the code vector by using some of the secondary keys, E1, E2 and E3. In this example it is required that two of the three secondary keys be present in order to reconstruct the code vector. The total number of secondary keys, the number of secondary keys required to reconstruct the code vector and the number of errors which can be corrected by the error correcting code must be chosen in a coordinated manner such that after the required number of secondary keys have been used to correct some of the errors in the corrupted code vector, the error correcting code is capable of correcting the remaining errors, but the error correcting code is not capable of correcting the remaining errors if no more than one less than the required number of secondary keys is present.

In this example, two secondary keys are required to be present in order to remove enough of the errors in the corrupted code vector to allow the error correcting code circuit to correct the remaining errors. The error correcting code circuit of this example is capable of correcting up to two errors.

For the purpose of demonstrating this example, assume that secondary keys E1 and E3 are presented to the lock mechanism. One example of a method for distributing secondary keys is by the use of cards with magnetic strips that can be encoded with the secondary keys. The lock mechanism would then consist of one or more card readers so that the secondary keys could be read into the lock mechanism, appearing for example, at the EA and EB inputs shown in FIG. 1. Addition circuit 100 now performs the function of adding the two secondary keys presented to the lock mechanism and the corrupted code vector which is maintained within the lock mechanism, for example in shift register 100 as follows:

```
CV    101011100101101
E1 +  001000000000100
E3 +  010000010000000
CV'   110011110101001
```

The partially corrected corrupted code vector CV' now has two residual errors left. CV' is now presented to the error correction circuit 200 over conductor 105, by means of which the partially corrected corrupted code vector is corrected to yield the original code vector at the code vector output of the error correction circuit according to the procedures outlined in detail in Berlekamp's book for the example error correction circuit 200.

A number of variations of the invention may be constructed without departing from the scope of the invention. The invention as described may be considered to have one level of keys. It may be desirable to have multiple levels of keys, corresponding for example to the different levels of management in a company, perhaps including one single key for the chief executive of a company.

The corrupted code vector may be changed without changing the secondary keys in order to discourage or defeat attempts to break the lock mechanism. If it is necessary to change one or more of the secondary keys for whatever reason, that may be done without changing the remaining secondary keys. In this case the corrupted code vector will of course have to be replaced. It may be desirable to be able to change the corrupted code vector which is contained in the lock mechanism, from time to time. In order to do that an input will have to be provided in order to change the contents of the corrupted code vector shift register 103. It may also be desirable in some applications of the invention to make the corrupted code vector contained in the lock mechanism unchangable or difficult to change in order to improve security. It would be possible to provide different types of mechanisms, e.g. a mechanical setting, in order to provide some of the advantages of both alternatives.

What has been described is considered to be only one specific illustrative embodiment of the invention and it is to be understood that various other arrangements may be devised by one skilled in the art without departing from the spirit and scope thereof as defined by the accompanying claims.

What is claimed is:

1. A method for generating a certain number of secondary keys and for using some of said secondary keys in cooperation with a corrupted code vector to reconstruct a code vector having a length of N digits, comprising the steps of:

choosing a certain number, n, of secondary keys to be distributed to n individuals;

assigning a subset of digit positions comprising e of said N digit positions of said code vector to each of said secondary keys in a random manner such that the total number of such digit positions assigned is equal to a certain number $T = n \times e$;

calculating a corrupted code vector by creating errors in each of said T digit positions of said code vector assigned to said secondary keys and in $e'$ randomly chosen digit positions;

choosing an error correcting code system comprising a set of code vectors, and a procedure for correcting code vectors which have been corrupted by errors, into the corresponding code vectors provided that there have been no more than $t = (n-k)e + e'$ errors in the digits of an N digit code vector; and reconstructing said code vector by using any k of said n secondary keys to correct the errors in $k \times e$ of said N digit positions of said N digit corrupted code vector followed by using said error correcting code system to correct the remaining errors in no more than t digit positions.

2. A method for generating a certain number of secondary keys and for using some of said secondary keys in cooperation with a corrupted code vector to reconstruct a code vector according to claim 1 wherein:

said subset of digit positions corresponding to each secondary key are mutually exclusive.

3. A method for generating a certain number of secondary keys and for using some of said secondary keys in cooperation with a corrupted code vector to reconstruct a code vector according to claim 1 wherein said method further comprises:

a first step of choosing a key and encoding said key into said code vector; and a last step of decoding said reconstructed code vector to yield said key.

4. A circuit for generating a certain predetermined code vector if a certain number k of secondary keys are presented to the input thereof, comprising:

corrupted code vector memory comprising: an output and means for presenting at said output the contents of said memory;

combining means comprising: k inputs connected to receive said secondary keys, an input connected to said corrupted code vector memory, an output and means for combining said signals present on said inputs in order to cancel the effect of the errors represented by said secondary keys in said corrupted code vector;

error correction means comprising: an input connected to the output of said combining means, an output and means for correcting errors in a certain number of bit positions in the signal presented at the input thereof and for presenting the corrected code vector at said output; and a code vector output connected to said output of said error correction means.

5. A lock mechanism for use with a plurality of secondary keys comprising:

a plurality of secondary key input means, one for each of said secondary keys;

a corrupted code vector source for supplying a code vector which has a certain number of errors;

an error removal circuit comprising a pluralilty of inputs, one connected to each of said secondary key input means, an input connected to the output of said corrupted code vector source, an output and means for removing from said corrupted code vector the errors corresponding to the secondary key signals present on said plurality of secondary key input means;

an error correction circuit comprising: an input connected to the output of said error removal circuit, an output and means for correcting up to a certain number of errors in the signal presented at the input thereof and for presenting the corrected signal at the output thereof; and an output for presenting the corrected code vector connected to the output of said error correction circuit.

* * * * *